United States Patent Office

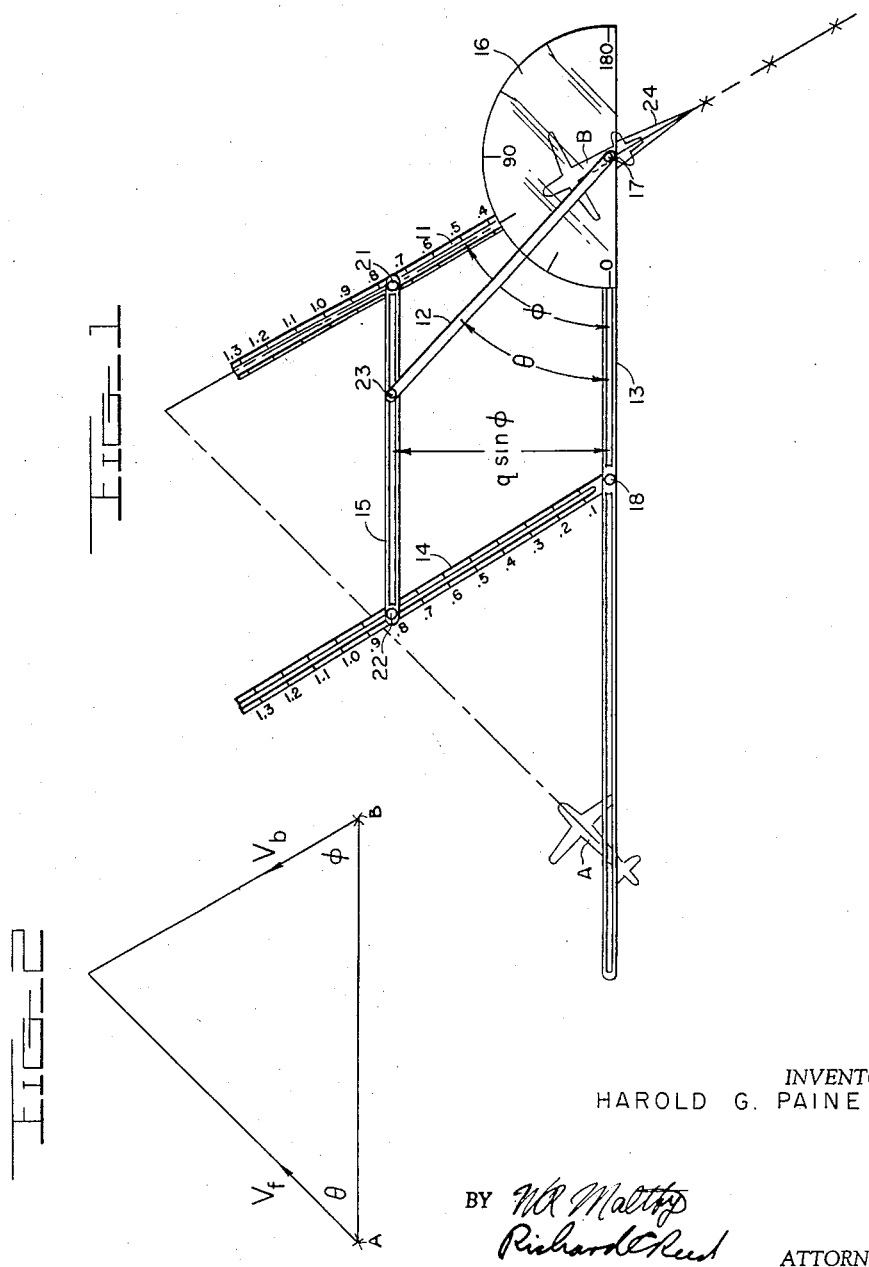

2,924,882
Patented Feb. 16, 1960

2,924,882

LEAD ANGLE SOLVER

Harold G. Paine, Washington, D.C.

Application December 31, 1956, Serial No. 631,984

2 Claims. (Cl. 33—98)

(Granted under Title 35, U.S. Code (1952), sec. 266)

The invention described herein may be manufactured and used by or for the Government of the United States of America for governmental purposes without the payment of any royalties thereon or therefor.

The present invention relates in general to navigational instruments and in particular to apparatus for determining the lead angle in computing interception headings between two objects which are subject to relative motion.

In the navigation of ships and aircraft it is frequently necessary to make computations of relative motion of two objects so that an intercept may be purposely obtained or avoided. The so-called vectoring technique of visual estimation which heretofore has been widely used for such computations provides satisfactory results in many instances, however, it is subject to certain basic limitations. Reasonably accurate results require that determinations be made of several variables such as position, heading, speed of objects, wind velocity, and the like. These determinations together with the actual calculations involved in the prior techniques require considerable skill, equipment and are time consuming.

Other types of relative motion devices have been used but they are bulky, complicated and make use of parts having restricted movements which limits their use and they have various other drawbacks.

It is accordingly an object of the present invention to provide a device for determining the lead angle required to provide an intercept or "collision" course between two bodies subject to relative motion.

Another object is to provide a device of simple construction for determining the lead angle required to provide an intercept between two bodies subject to relative motion without requiring considerable skill and equipment.

Still another object is to provide a computer which can be used for high speed airplanes or missiles as well as slow speed ships or other type devices to determine relative motion problems so that an intercept may be purposely attained or avoided.

Other and more specific objects of this invention will become apparent upon a more careful consideration of the following detailed description when taken together with the accompanying drawings, in which;

Fig. 1 illustrates a plan view of the complete computer, and

Fig. 2 is a navigational triangle required to provide an interception between a target and an interceptor.

In accordance with the teachings of the present invention, a navigation instrument is provided for determining the lead angle that one object must take in order to make an interception with another object having relative motion. This instrument successfully avoids undue structural complications and dispenses with the use of other related instruments for actual determination of an intercept course.

The device of the present invention is intended for use in conjunction with an object locating device presenting a form of area-type signal presentation such as a radar set with a plan position indicator. The computer is associated with the P.P.I. at a central intelligence receiving station to determine the proper direction of travel between two objects in an area in order to cause intercept or avoidance thereof. The proper instructions for guidance or control of an object for intercept or avoidance is transmitted to the interceptor from the central station. The computer is a separate instrument which is used in conjunction with a P.P.I. only when guidance and instruction are necessary and comprises parts which are moved relative to each other in accordance with the position of two objects appearing on a P.P.I. scope and by proper relative movement of the respective parts, motion headings can be obtained which will result in intercept or avoidance of intercept.

Referring now to Fig. 1 there is shown a preferred embodiment which comprises five related linkage arms 11—15, arms 11, 14 and 15 are provided with longitudinal slots along the center thereof to permit relative movement between the arms and a bearing-rose 16 which is in the form of a protractor having a scale of 0 to 180 degrees along the peripheral edge. Arms 11 and 12 are pivotably connected at 17 at the angle reference index of the bearing-rose, arm 13 is rigidly connected at 17 to the angle reference index of the bearing-rose and extends therefrom with the centerline along 0 degrees with respect to the bearing-rose, arm 14 is pivotably connected at 18 along the centerline of arm 13, whereas arm 15 is pivotably and slidably connected at 21 and 22 at each end thereof in the slots of arms 11 and 14 respectively and adapted to be positioned parallel to arm 13 such that arm 11 is parallel to arm 14. Arm 12 which is pivotably connected at one end to the angle reference index at 17 is pivotably and slidably connected at the opposite end at 23 in the slot of arm 15. The pivotable and slidable connections between the arms allows for different adjusting conditions that arise during determination of different lead angles for an interception. When in assembled relationship arms 11 and 14 are parallel to each other and arms 13 and 15 are parallel to each other to form a parallelogram as shown in Fig. 1.

Arms 11 and 14 are of equal length and have identical $q$ scales thereon graduated in tenths from zero at their respective pivot points to any desired length. The $q$ scale represents the ratio of the speeds of the target and the interceptor and is determined by the formula $$q = \frac{V_t}{V_i}$$

where $V_t$ is the speed of the target and $V_i$ is the speed of the interceptor. Arm 12 is associated with the $q$ scale and is made to have a length between the pivotable connection 17 and the pivotable and slidable connection 23 which corresponds to the length of the $q$ scale from 0 to 1.0 along arms 11 and 14. Arm 12 is also related to fixed arm 13 and forms therewith an angle $\theta$ which is the lead angle that the interceptor must take in order to intercept the target.

In order for an interception to be possible, the path of travel of the interceptor and target must form a triangle with the line of sight between the positions of the interceptor and target. This triangle is known as the general navigational triangle and is formed by the velocity vectors of the interceptor and the target, and a distance line between the interceptor and target, with the vectors starting at the relative positions of the interceptor and target and extending in their respective direction of travel.

The lead angle $\theta$, formed by the interceptor vector and the line of sight, is related to the angle $\phi$ formed by the target vector and the line of sight by the formula $\theta = \text{arc sin } (q \sin \phi)$ where $q$ is the speed ratio of the target to the interceptor. The device of this invention solves the angle $\theta$ required for the interceptor to travel relative to the line of sight between the target and the interceptor, and in operation of the device, the position of arm 12 relative to arm 13 will determine the angle $\theta$ by proper alignment of the device relative to the position of the target, the interceptor and the target track. The perpendicular distance between arm 15 and arm 13 will be equal to $q \sin \phi$ to provide the proper angle $\theta$ for interception.

In operation of the device, for example, the determination of the lead angle for an intercept or a collision course between a target B and an interceptor A, two blips appearing as the target and the interceptor are noted on the P.P.I. scope, the speeds of the target and interceptor are noted and ($q$) the ratio of the speeds are calculated. The cross arm 15 is positioned to register with the same value in distance from the arm 13 along the scales on arms 11 and 14; and set at the designated $q$ scale value along arms 11 and 14 according to the calculated ratio of the speeds and then the computer device is positioned with the angle reference index at 17 over the target's present position. With the center line of arm 13 held over the interceptor's present position and with the reference index 17 of the bearing-rose held over the target's indicated position, arm 11, with the aid of extension 24, is rotated until it is in line with the target track. This alignment places arm 11 at a specific angle $\phi$ relative to arm 13 which angle is indicated by the number of degrees on the bearing-rose appearing under the centerline of the arm, said alignment also positions arm 12 at an angle $\theta$ relative to arm 13 and the number of degrees indicated by the angle $\theta$ determines the angle that the interceptor must travel with respect to the line of sight between the interceptor and the target in order to make an interception. As shown in Fig. 2, the navigational triangle is formed by the velocity vector $V_f$ of the fighter or interceptor, the velocity vector $V_b$ of the bomber or target and the line of sight between the interceptor and target when determining the interception angle. The triangle illustrates the required angular relationship required for interception between the target and the interceptor as determined by the device of the invention for the relative positions as shown in Fig. 1.

After the correct heading has been obtained by use of the computer, the heading is transmitted to the interceptor and the computer can be removed from the scope.

The above procedure may be carried out for aircraft to aircraft, aircraft to ship, and ship to submarine interception or any other objects having relative motion provided the direction and speed of the objects are such that an interception is possible. It can be seen that the same method can be used to determine a safe course to follow between two objects having relative speeds and direction, to prevent a collision or damage to one or both. Relative speeds or course of two moving objects may change over a period of time, in this case, additional solutions can be made from later positions of the two objects travel in order to intercept the target.

In the event subsequent computations must be made, the step of setting the ratio of the speeds along the arms will not be necessary unless, of course, there has been a change of speed. If there has been no change in speed the only change in computing the correct heading would be in repositioning the computer and reading the degrees on the bearing-rose for the correct lead angle.

In order to determine if an interception can be made between an interceptor and a target ($q \sin \phi$) of the formula $\theta = \text{arc sin } (q \sin \phi)$ cannot be greater than one. If the value is greater than one, interception cannot be made without changing the speed of the interceptor. The position of arm 12, determines the value $q \sin \phi$ by controlling the perpendicular distance between arms 13 and 15. Since arm 12 is made equal to unity, under certain circumstances, according to the relative speeds and the direction of travel of the target, arm 12 would restrict the positioning of arm 11 such that arm 11 could not be positioned along the path of travel of the interceptor and yet allow the center line of arm 13 to be positioned over the interceptor and the reference index 17 over the target. Under such circumstances it is desired to inform the interceptor as soon as possible that an interception is not possible. When the above operational steps are carried out and the step of positioning arm 11 over the path of travel of the target cannot be carried out due to restricted movement of arm 12, interception cannot be made and the interceptor can be readily informed to prevent wasted time of travel for anticipation of an interception.

The device as shown in Fig. 1 is adapted for use in determining the collision course between an interceptor and a target when the speed of the interceptor is greater than the target. It is to be understood that by extending arm 15 beyond arm 11 such that arm 12, may, if necessary, cross over arm 11, the device can then be used for determining a collision course where the speed of the target is greater than the interceptor.

Obviously many modifications and variations of the present invention are possible in the light of the above teaching. It is therefore to be understood, that within the scope of the appended claims, the invention may be practiced otherwise than as specifically described.

What is claimed is:

1. A computing device for determining the lead angle heading for interception between two objects subject to relative motion comprising a bearing-rose in the form of a protractor graduated from 0 to 180 degrees from left to right and having an angle reference index, a first arm rigidly secured to the angle reference index of said bearing-rose and extending therefrom with the center line along the 0 degree line relative to the graduations on said bearing-rose, second and third arms adapted to be pivotably connected at the angle reference index of said bearing-rose and adapted to extend therefrom in the same quadrant, said third arm being equal to unity, a fifth arm, a fourth arm adapted to be pivotably connected to said first arm at a fixed position from said angle reference index equal in length to the fifth arm, and extend in the same direction as said second arm, said fifth arm adapted to be pivotably and slidably connected at the ends thereof to said second and fourth arms at equal distances from said first arm, said third arm adapted to be pivotably and slidably connected to said fifth arm at a position between said fourth and said second arm, said second and fourth arms being equal in length said length being greater than unity.

2. A computing device for determining the lead angle heading for interception between two objects subject to relative motion comprising a bearing-rose in the form of a protractor graduated from 0 to 180 degrees from left to right having an angle reference index, a first arm rigidly secured to the angle reference index of said bearing-rose and extending therefrom with the center line along 0 degrees relative to the graduations on said bearing-rose, second and third arms adapted to be pivotably connected to the angle reference index of said bearing-rose, a fourth arm and a fifth arm, said fourth arm adapted to be pivotably connected to said first arm at a fixed position from said angle reference index equal in length to said fifth arm and to extend in the same direction as said second arm, said second and fourth arms being equal in length and graduated in units from 0.0 to at least 1.0 which represents the ratio of the speeds of said objects, said fifth arm adapted to be pivotably and slidably connected at the ends thereof to said second and fourth arms and positioned therebetween at equal distances from said first arm, said third arm being equal to the length of said second and fourth arms from 0.0 to 1.0 and adapted to be pivotably and slidably connected to said fifth arm at a position between said second and fourth arms to form a reference angle relative to said first arm, said device being adapted to be positioned over a P.P.I. scope with the angle reference index over the object to be intercepted and the center line of said first arm over the interceptor.

References Cited in the file of this patent

UNITED STATES PATENTS

| | | |
|---|---|---|
| 1,538,825 | Kooiman | May 19, 1925 |
| 1,661,096 | Rowe | Feb. 28, 1928 |

FOREIGN PATENTS

| | | |
|---|---|---|
| 317,985 | Germany | Jan. 9, 1920 |
| 703,410 | France | Feb. 9, 1931 |
| 13,399 | Netherlands | July 15, 1925 |